(12) United States Patent
Palm et al.

(10) Patent No.: US 6,712,974 B1
(45) Date of Patent: Mar. 30, 2004

(54) FILTERABLE COMPOSITE ADSORBENTS

(75) Inventors: Scott K. Palm, Santa Barbara, CA (US); Timothy R. Smith, Lompoc, CA (US); Jerome C. Shiuh, Lompoc, CA (US); John S. Roulston, Lompoc, CA (US)

(73) Assignee: Advanced Minerals Corporation, Santa Barbara, CA (US)

( * ) Notice: Subject to any disclaimer, the term of this patent is extended or adjusted under 35 U.S.C. 154(b) by 0 days.

(21) Appl. No.: 09/145,796

(22) Filed: Sep. 2, 1998

Related U.S. Application Data

(63) Continuation of application No. 09/001,965, filed on Dec. 31, 1997, now abandoned, which is a continuation-in-part of application No. 08/781,325, filed on Jan. 10, 1997, now abandoned.

(51) Int. Cl.$^7$ .......................... B01J 29/06; B01J 21/16; B01J 20/02; B01J 20/22

(52) U.S. Cl. ................ 210/660; 210/348; 210/500.1; 210/502.1; 210/503; 210/510.1; 95/90; 502/400; 502/401; 502/404; 502/405; 502/407; 502/410; 502/415; 502/60; 502/80

(58) Field of Search ................ 502/400, 405, 502/407, 60, 80, 401, 404, 410, 415; 210/348, 500.1, 502.1, 503, 510.1, 660; 95/90

(56) References Cited

U.S. PATENT DOCUMENTS

| | | | |
|---|---|---|---|
| 1,375,532 A | | 4/1921 | Müller |
| 2,967,149 A | | 1/1961 | McCollum |
| 3,813,347 A | | 5/1974 | Hayes |
| 3,917,814 A | * | 11/1975 | Hedges et al. |
| 4,059,544 A | | 11/1977 | Yamaguchi et al. |
| 4,105,576 A | * | 8/1978 | Seidenberger |
| 4,168,250 A | | 9/1979 | Sutthoff et al. |
| 4,343,751 A | * | 8/1982 | Kumar .................... 264/37.29 |
| 4,447,380 A | * | 5/1984 | Shannon et al. |
| 4,505,823 A | | 3/1985 | Klein |
| 4,596,660 A | * | 6/1986 | Hou |
| 4,732,887 A | | 3/1988 | Obanawa et al. |
| 5,077,070 A | | 12/1991 | Regutti |
| 5,085,784 A | * | 2/1992 | Ostreicher |
| 5,104,632 A | | 4/1992 | Douden et al. |
| 5,229,013 A | * | 7/1993 | Regutti |
| 5,379,681 A | * | 1/1995 | Rollen |
| 5,484,620 A | | 1/1996 | Oechsle et al. |
| 5,776,353 A | * | 7/1998 | Palm et al. |
| 5,827,457 A | * | 10/1998 | Tseng |

FOREIGN PATENT DOCUMENTS

| | | |
|---|---|---|
| CZ | 241725 | 8/1985 |
| EP | 0 144 200 | 6/1985 |
| EP | 0 573 303 | 12/1993 |
| EP | 0 790 070 | 8/1997 |
| FR | 1 241 881 | 8/1960 |
| GB | 1 116 664 | 6/1968 |
| GB | 1 373 394 | 11/1974 |
| GB | 2 166 427 | 5/1986 |
| JP | 61-26578 A | * 2/1986 |
| JP | 63-294917 | 12/1988 |
| JP | 3-33076 A | * 2/1991 |
| JP | 7-47266 | 2/1995 |

OTHER PUBLICATIONS

Merriam–Webster's Collegiate Dictionary, Tenth Edition, 1999, p. 1096.*

Analytica–EBC of the European Brewery Convention, 4th ed., Zurich: Braurei–und Getranke–Rundschan, pp. E–255–E–258 (1987).

Bear, J., "Chapter 5: The Equation of Motion of a Homogeneous Fluid," in *Dynamics of Fluids in Porous Media*, New York, Dover Publications, Inc., pp. 119–194 (1988).

Berry, L.G. et al., "Appendix A: Natural Glasses and Macerals," in *Mineralogy*, 2nd ed., New York, Freeman and Co., pp. 540–542 (1983).

Breese, R. and Barker, J., "Diatomite," in *Industrial Minerals and Rocks*, Littleton, Colorado, Society for Mining, Metallurgy, and Exploration, pp. 397–412 (1994).

Brunauer, S. et al., "Adsorption of Gases in Multimolecular Layers," *Am. Chem. Soc.*, 60, pp. 309–319 (1938).

Cain, C.W., Jr., "Filter Aid, Use in Filtration," in *Encyclopedia of Chemical Processing and Design*, New York, Marcel Dekker, pp. 348–372 (1984),.

Geitgey, R.P., "Pumice and Volcanic Cinder," in: *Industrial Minerals and Rocks*, Littleton, Colorado, Society for Mining, Metallurgy, and Exploration, Inc., pp. 803–813 (1979).

Guiambo, N. et al., "Colloid Filtration by Pre–Coat and Body–Feed Using Filter–Aids," in *Mines & Carrieres: Les Techniques*, Mar., pp. 29–32 (1991).

(List continued on next page.)

*Primary Examiner*—M. Alexandra Elve
*Assistant Examiner*—Christina Ildebrando
(74) *Attorney, Agent, or Firm*—Morrison & Foerster LLP

(57) ABSTRACT

This invention relates to filterable composite adsorbents comprising one or more adsorbent components and one or more filtration components, and methods for preparing and using same. More particularly, this invention pertains to filterable composite adsorbents and filterable composite adsorbent products which are suitable for use in filtration applications, and which comprise one or more microparticulate or colloidal adsorbent components selected from the group consisting of silica gel, fumed silica, neutral clay, alkaline clay, zeolite, solid catalyst, alumina, adsorbent polymer, alkaline earth silicate hydrate, and combinations thereof, which bear the property of adsorption, which are intimately bound to one or more functional filtration components selected from the group consisting of biogenic silica (e.g., diatomite, rice hull ash, sponge spicules), natural glass (e.g., expanded perlite, pumice, expanded pumice, pumicite, expanded obsidian, expanded volcanic ash), buoyant glass, buoyant polymer, cellulose, and combinations thereof, which bear a distinguishing porous and intricate structure and buoyancy suitable for filtration.

60 Claims, No Drawings

OTHER PUBLICATIONS

Hermanson, G.T. et al., *Immobilized Affinity Ligand Techniques* (San Diego, Academic Press Inc.), pp. 11–14 (1992).

Kiefer, J., "Kieselguhr Filtration," *Brauwelt International*, IV/1991; pp. 300–309 (1991).

Langmuir, I., "The Constitution and Fundamental Properties of Solids and Liquids," *J. Am. Chem. Soc.* vol. 38, pp. 2221–2295 (1916).

Langmuir, I., "The Evaporation, Condensation and Reflection of Molecules and the Mechanism of Adsorption," *Phys. Rev.*, vol. 8, No. 4, pp. 149–176 (1916).

Langmuir, I., "The Adsorption of Gases on Plane Surfaces of Glass, Mica, and Platinum," *J. Am. Chem. Soc.*, vol. 40, pp. 1361–1403 (1918).

Machel, J. et al., "Pomoce filtracyjne w proceesi oczyszczania sxkla wodnego," *Przem. Chem.*, vol. 52, No. 4, pp. 297–301 (1973), with English language translation.

Nordén, H. et al., "Application of Volume Balances and the Differential Diffusion Equation to Filtration," in *Separation Science and Technology*, vol. 29, No. 10, pp. 1319–1334 (1994).

Patel, R. et al., "Radium Removal from Water by Manganese Dioxide Adsorption and Diatomaceous Earth Filtration: Final Report, Environmental Pollution & Control, Water Pollution & Control," *Gov. Rep. Announce. Index (U.S.)*, vol. 5, publication No. 211,222 (1992).

Ruthven, D.M., "Adsorption," in: *Kirk–Othmer Encyclopedia of Chemical Technology*, 4th ed., vol. 1, Kroschwitz, J.L., editor, John Wiley & Sons, pp. 493–528 (1991).

Schuler, P.F. et al., "Diatomaceous Earth Filtration of Cysts and Other Particulates Using Chemical Additives," *J. Am. Water Works Assoc.* vol. 82, No. 12, pp. 67–75 (1990).

* cited by examiner

US 6,712,974 B1

FILTERABLE COMPOSITE ADSORBENTS

RELATED APPLICATIONS

This application is a continuation-in-part of U.S. Ser. No. 09/001,965 filed Dec. 31, 1997, now abandoned which is a continuation-in-part of U.S. Ser. No. 08/781,325 filed Jan. 10, 1997, now abandoned. The prior applications are incorporated herein by reference in their entirety.

TECHNICAL FIELD

This invention relates to composites comprising one or more adsorbent components and one or more filtration components, and methods for preparing and using same. More particularly, this invention pertains to filterable composite adsorbents and filterable composite adsorbent products which are suitable for use in filtration applications, and which comprise one or more microparticulate or colloidal adsorbent components selected from the group consisting of silica gel, fumed silica, neutral clay, alkaline clay, zeolite, solid catalyst, alumina, adsorbent polymer, alkaline earth silicate hydrate, and combinations thereof, which bear the property of adsorption, which are intimately bound to one or more functional filtration components selected from the group consisting of biogenic silica (e.g., diatomite, rice hull ash, sponge spicules), natural glass (e.g., expanded perlite, pumice, expanded pumice, pumicite, expanded obsidian, expanded volcanic ash), buoyant glass, buoyant polymer, cellulose, and combinations thereof, which bear a distinguishing porous and intricate structure and buoyancy suitable for filtration.

DESCRIPTION OF THE RELATED ART

Throughout this application, various publications, patents, and published patent applications are referred to by an identifying citation; full citations for these documents may be found at the end of the specification immediately preceding the claims. The disclosures of the publications, patents, and published patent specifications referenced in this application are hereby incorporated by reference into the present disclosure to more fully describe the state of the art to which this invention pertains.

Adsorption is the term commonly used to describe the tendency of molecules from an ambient fluid phase to adhere to the surface of a solid, and has been recently reviewed in detail (Ruthven, 1991). Adsorption is a fundamental property of matter, having its origin in the attractive forces between molecules. The solid's force field creates a region of low potential energy near the solid's surface such that the molecular density close to the solid's surface is generally greater than in the bulk fluid. This results in the phenomenon of adsorption, in which the solid surface adsorbs various constituents from a multiconstituent fluid, to a degree which varies according to the solid surface's affinity for a particular constituent.

To achieve a significant adsorptive capacity, and thus to be highly practical for commercial use, an adsorbent preferably has a high specific area, which implies a highly porous structure with very small micropores. A method that is often preferred for determining specific area is performed by specialized instruments which use a BET (Brunauer et al., 1938) modification of Langmuir adsorption (Langmuir, 1916a, 1916b, 1918) of nitrogen, krypton, or other suitable gas at the surface of a sample of the solid under highly controlled conditions. Pore size and distribution are often determined by mercury intrusion porosimetry instruments operated under highly controlled conditions, which are capable of providing detailed information about pore sizes from about 6 nanometers to about 300 micrometers in diameter. Generally speaking, specific surface areas of practical adsorbents range from about 300 to 1200 $m^2/g$, with macropores greater than about 0.050 $\mu m$ (i.e., 50 nanometers) in diameter contributing little to adsorptive behavior.

The specific adsorptive properties of a practical adsorbent depend on its pore size and pore size distribution as well as on the nature of the solid surface. For example, a crystalline zeolite has a comparatively narrow pore size distribution and a polar surface; an amorphous silica gel has a comparatively broad pore size distribution and a polar surface; and a carbon molecular sieve is comparatively narrow in pore size distribution with a nonpolar surface. These principal characteristics for many adsorbents have been successfully engineered to permit the selective adsorption of components from fluids.

One common method of using an adsorbent is to simply place it in contact with a fluid containing one or more constituents that need to be adsorbed from it, either to purify the fluid by selectively removing the constituents, or to isolate the constituents so as to purify them from the fluid in which they are contained. Usually, the adsorbent containing the adsorbed constituents is then separated from the fluid, typically by filtration.

One typical method for separating adsorbents from fluids is through the use of filtration, in which the fluid can be in either a liquid or gaseous state. In the field of filtration, many methods of particle separation from fluids employ, for example, expanded perlite or natural glasses, or diatomite products, as porous filtration media. Although not usually as effective for the selective adsorption as commercial adsorbents, these products do have intricate and porous structures of greater size that are uniquely suited to the effective physical entrapment of particles, for example in filtration processes. These intricate and porous structures create networks of void spaces that result in buoyant filtration media particles that have apparent densities similar to those of the fluids in which they are suspended. It is common practice to employ porous filtration media when improving the clarity of fluids that contain suspended particles or particulate matter such as adsorbents, or have turbidity.

Since the requirement for high specific surface area is inextricably coupled with extremely fine pore size in order to create an effective, practical adsorbent, many adsorbents are not readily separated (e.g., filtered) from the fluids in which they have been suspended, because the individual particles of adsorbents cannot be made larger than the colloidal or fine microparticulate size range in their pure form and still retain both buoyancy and the desired adsorbent properties. The efficiency of many adsorbents in fluid system applications would be improved if the adsorbents were made more permeable or if more buoyant adsorbents were possible.

The filtration of microparticulate or colloidal adsorbents is usually difficult, since the adsorbent particles are not readily and/or effectively filterable. For example, merely blending microparticulate or colloidal adsorbents into porous filtration media products reduces the efficiency and permeability of the porous filtration media, as the adsorbents are typically of such a size as to behave as particles that detrimentally occupy the valuable void spaces that result from the intricate structure of the porous filtration media. Often, blended mixtures do not have the flow rate of the more permeable filterable composite adsorbent products of the present invention.

References which pertain to the filtration problems associated with adsorbents and methods of overcoming these problems in conjunction with the use of filter aids include Guiambo et al. (1991), Patel et al. (1992), Kucera et al. (1987), Machel et al. (1973), Schuler et al. (1990), and Fukua (1988).

McCollum (1961) describes a method of introducing an acidic montmorillonite clay as a mixture into a perlite ore prior to subjecting the mixture to a conventional perlite expansion process. This method appears to be highly limited with regard to the quantity of acidic montmorillonite clay that can be effectively bound to the perlite after expansion, as perlite particles greatly increase in volume, up to twenty times, during expansion. In fact, it appears that McCollum achieved at most about 15% attached acidic montmorillonite clay. McCollum did not teach that more buoyant glasses, such as expanded perlite, can be used as starting materials, or that materials other than acidic montmorillonite clay could be used as an adsorbent component. McCollum also did not teach that material other than perlite or its derivatives could be used as a functional filtration component. While McCollum does not disclose any means to discriminate whether the acidic clay has actually been intimately bound to the functional filtration component or it is has formed merely a mixture with it, the methods described in the examples of the present invention, which provide for more intimate contact, are far more efficient for achieving intimate binding of adsorbents to functional filtration components, as demonstrated in the examples.

The filterable composite adsorbents of the present invention, inter alia, overcome the filtration difficulties encountered with microparticulate or colloidal adsorbents.

In the filterable composite adsorbents of the present invention, one or more microparticulate or colloidal adsorbent components is intimately bound to one or more functional filtration components. The filterable composite adsorbents of the present invention retain both the adsorptive properties of the adsorbent component and the intricate and porous structure of the functional filtration component, thus greatly enhancing the utility of the filterable composite adsorbents in practical applications. The filterable composite adsorbents of the present invention offer a spectrum of permeabilities comparable to the range offered by their functional filtration components.

SUMMARY OF THE INVENTION

One aspect of the present invention pertains to a novel composite comprising one or more first components selected from the group consisting of silica gel, fumed silica, neutral clays, alkaline clays, zeolite, solid catalyst, alumina, adsorbent polymer, alkaline earth silicate hydrate, and combinations thereof, intimately bound to one or more functional second components selected from the group consisting of biogenic silica (e.g., diatomite, rice hull ash, sponge spicules), natural glass (e.g., expanded perlite, pumice, expanded pumice, pumicite, expanded obsidian, expanded volcanic ash), buoyant glass, buoyant polymer, cellulose, and combinations thereof.

In one embodiment, the first component(s) is an adsorbent component and imparts absorbent properties to the composite, whereas the second component(s) is a functional filtration component, and confers filtration ability to the composite.

In one embodiment, the adsorbent (first) component is selected from the group consisting of silica gel and fumed silica. In one embodiment, the adsorbent component is selected from the group consisting of neutral clays and alkaline clays. In one embodiment, the adsorbent component is selected from the group consisting of zeolite, alumina, and alkaline earth silicate hydrate. In one embodiment, the adsorbent component is adsorbent polymer.

In one embodiment, the functional filtration (second) component is biogenic silica. In one embodiment, the functional filtration component is diatomite. In one embodiment, the functional filtration component is rice hull ash. In one embodiment, the functional filtration component is sponge spicules. In one embodiment, the functional filtration component is a natural glass. In one embodiment, the functional filtration component is selected from the group consisting of expanded perlite, pumice, expanded pumice, pumicite, expanded obsidian, and expanded volcanic ash. In one embodiment, functional filtration component is expanded perlite.

In one embodiment, the adsorbent component is silica gel, and the functional filtration component is biogenic silica. In one embodiment, the adsorbent component is silica gel, and the functional filtration component is a natural glass. In one embodiment, the adsorbent component is silica gel, and the functional filtration component is selected from the group consisting of expanded perlite, pumice, expanded pumice, pumicite, expanded obsidian, and expanded volcanic ash. In one embodiment, the adsorbent component is silica gel, and the functional filtration component is expanded perlite.

In one embodiment, the adsorbent component is fumed silica, and the functional filtration component is biogenic silica. In one embodiment, the adsorbent component is fumed silica, and the functional filtration component is a natural glass. In one embodiment, the adsorbent component is fumed silica, and the functional filtration component is selected from the group consisting of expanded perlite, pumice, expanded pumice, pumicite, expanded obsidian, and expanded volcanic ash. In one embodiment, the adsorbent component is fumed silica, and the functional filtration component is expanded perlite.

In one embodiment, the adsorbent component is a neutral clay or alkaline clay, and the functional filtration component is biogenic silica. In one embodiment, the adsorbent component is a neutral clay or alkaline clay, and the functional filtration component is a natural glass. In one embodiment, the adsorbent component is a neutral clay or alkaline clay, and the functional filtration component is selected from the group consisting of expanded perlite, pumice, expanded pumice, pumicite, expanded obsidian, and expanded volcanic ash. In one embodiment, the adsorbent component is a neutral clay or alkaline clay, and the functional filtration component is expanded perlite.

In one embodiment, the adsorbent component is a zeolite, and the functional filtration component is biogenic silica. In one embodiment, the adsorbent component is a zeolite, and the functional filtration component is a natural glass. In one embodiment, the adsorbent component is a zeolite, and the functional filtration component is selected from the group consisting of expanded perlite, pumice, expanded pumice, pumicite, expanded obsidian, and expanded volcanic ash. In one embodiment, the adsorbent component is a zeolite, and the functional filtration component is expanded perlite.

In one embodiment, the adsorbent component is alumina, and the functional filtration component is biogenic silica. In one embodiment, the adsorbent component is alumina, and the functional filtration component is a natural glass. In one embodiment, the adsorbent component is alumina, and the functional filtration component is selected from the group consisting of expanded perlite, pumice, expanded pumice, pumicite, expanded obsidian, and expanded volcanic ash. In one embodiment, the adsorbent component is alumina, and the functional filtration component is expanded perlite.

In one embodiment, the adsorbent component is an adsorbent polymer, and the functional filtration component is biogenic silica. In one embodiment, the adsorbent component is an adsorbent polymer, and the functional filtration component is a natural glass. In one embodiment, the adsorbent component is an adsorbent polymer, and the functional filtration component is selected from the group consisting of expanded perlite, pumice, expanded pumice, pumicite, expanded obsidian, and expanded volcanic ash. In one embodiment, the adsorbent component is an adsorbent polymer, and the functional filtration component is expanded perlite.

In one embodiment, the adsorbent component is an alkaline earth silicate hydrate, and the functional filtration component is biogenic silica. In one embodiment, the adsorbent component is an alkaline earth silicate hydrate, and the functional filtration component is a natural glass. In one embodiment, the adsorbent component is an alkaline earth silicate hydrate, and the functional filtration component is selected from the group consisting of expanded perlite, pumice, expanded pumice, pumicite, expanded obsidian, and expanded volcanic ash. In one embodiment, the adsorbent component is an alkaline earth silicate hydrate, and the functional filtration component is expanded perlite.

In one embodiment, the permeability of the filterable composite adsorbent is greater than the permeability of a simple mixture of the adsorbent component(s) and the functional filtration component(s) (more preferably greater by 5% or more), wherein the proportions of said adsorbent component(s) and said functional filtration component(s) in said simple mixture are identical to those used in the preparation of said filterable composite adsorbent.

In one embodiment, the median particle diameter of the filterable composite adsorbent is greater than the median particle diameter of a simple mixture of the adsorbent component(s) and the functional filtration component(s) (more preferably greater by 2% or more), wherein the proportions of said adsorbent component(s) and said functional filtration component(s) in said simple mixture are identical to those used in the preparation of said filterable composite adsorbent.

In one embodiment, the adsorbent component is selected from the group consisting of silica gel; fumed silica; neutral clay; alkaline clay; zeolite; solid catalyst; alumina, such as activated alumina; adsorbent polymer, for example, expanded polystyrene-divinylbenzene copolymer; and alkaline earth silicate hydrate, such as calcium silicate hydrate and magnesium silicate hydrate.

In another embodiment, the functional filtration component is selected from the group consisting of biogenic silica, for example diatomite; natural glass (such as expanded perlite, pumice, expanded pumice, pumicite, expanded obsidian, and expanded volcanic ash); buoyant glass (such as sand); synthetic glass (such as fiber glass, controlled pore glass, foamed glass); buoyant polymer, for example, a fibrous polymer (such as fibrous nylon, fibrous polyester) or a powdered polymer (such as polyvinylchloride-acrylic copolymer powder); and cellulose.

In another embodiment, the filterable composite adsorbent has a permeability of about 0.001 to about 1000 darcy. In another preferred embodiment, the filterable composite adsorbent has a permeability of about 0.01 to about 30 Da.

In one embodiment, the filterable composite adsorbent is prepared using a stationary bed furnace (e.g., muffle furnace, tray furnace, travelling grate furnace) or a rotary kiln.

Another aspect of the present invention pertains to compositions comprising a filterable composite adsorbent, as described above. In one embodiment, the composition is in the form of a powder. In another embodiment, the composition is in the form of a sheet, pad, or cartridge. In another embodiment, the composition is thermally sintered and/or chemically bonded in the form of a rigid shape (e.g., disk, cylinder, plate, polyhedron). In another embodiment, the composition is in the form of a monolithic support or an aggregate support. In another embodiment, the composition is in the form of a monolithic substrate or an aggregate substrate.

Yet another aspect of the present invention pertains to methods of adsorption and filtration which employ a filterable composite adsorbent, as described above. In one embodiment, the method of adsorption and filtration comprises the step of (i) suspending a filterable composite adsorbent, as described above, in a fluid containing suspended particulates or constituents to be adsorbed, followed by the step of (ii) separating the filterable composite adsorbent from the fluid.

In another embodiment, the method of adsorption and filtration comprises the step of (i) suspending a filterable composite adsorbent, as described above, in a fluid containing suspended particulates or constituents to be adsorbed, followed by the step of (ii) passing said fluid with suspended filterable composite adsorbent through a filterable composite adsorbent, as described above, supported on a septum.

In another embodiment, the method of adsorption and filtration comprises the step of passing a fluid containing suspended particles or constituents to be adsorbed through a filterable composite adsorbent, as described above, supported on a septum.

In another embodiment, the method of adsorption and filtration comprises the step of passing a fluid containing suspended particles or constituents to be adsorbed through a filterable composite adsorbent, in the form of a rigid shape, as described above.

In a embodiment, the fluid is a liquid (e.g., beer). In another embodiment, the fluid is a molten solid (e.g., oils high in saturated fats). In another embodiment, the fluid is a gas (e.g., air).

Other methods of adsorption and filtration which employ a filterable composite adsorbent include combinations of the above methods.

Still another aspect of the present invention pertains to methods for the preparation of filterable composite adsorbents which employ microwave radiation. In one embodiment, one or more adsorbent components are blended with one or more functional filtration components, and microwave radiation applied to the blend, thereby forming the filterable composite adsorbent.

As will become apparent, preferred features and characteristics of one aspect of the invention are applicable to any other aspect of the invention.

DETAILED DESCRIPTION OF THE INVENTION

A. Filterable Composite Adsorbents of the Present Invention

The filterable composite adsorbents of the present invention are suitable for use in filtration applications, and comprise one or more adsorbent components which are intimately bound to one or more functional filtration components. By the phrase "intimately bound" is it meant that the components are intimately and directly bound to each other without a binder material (although a fluxing chemical may be used, see below).

The filterable composite adsorbents of the present invention retain both the adsorptive properties of the adsorbent component and the intricate and porous structure of a functional filtration component, thus greatly enhancing the utility of the filterable composite adsorbents in practical applications. The filterable composite adsorbents of the present invention offer a spectrum of permeabilities comparable to the range offered by their functional filtration components.

Many methods for the separation of particles from fluids employ porous filtration media, the intricate and porous structures of which are particularly effective for the physical entrapment of particles in filtration processes; hence, they are useful as functional filtration components in the current invention. High specific surface area and extremely small pore size are characteristic features of adsorbents (e.g., silica gel, fumed silica, etc.) which make them useful as adsorbent components in the present invention.

In the filterable component adsorbents of the present invention, adsorbent components are intimately bound to functional filtration components, preferably by thermal sintering and/or chemical bonding, and are not merely mixed or blended together. Unlike the filterable composite adsorbents of the present invention, such simple mixtures tend to segregate upon suspension (e.g., in fluids) or conveyance or transport. The term "simple mixture" is used herein in the conventional sense to mean mechanical mixtures or blends (e.g., which have not been subjected to thermal sintering and/or chemical bonding).

The filterable composite adsorbent of the present invention may conveniently be considered to be an agglomerate of one or more adsorbent components and one or more functional filtration components. The term "agglomeration" is used herein in the conventional sense to refer to any method or effect in which particles are assembled into a coherent mass. One example of an agglomeration method is thermal sintering, wherein particles are caused to become a coherent mass (i.e., are intimately bound), and therefore an "agglomerate," by heating without melting. Note that, in thermal sintering, agglomeration does not proceed to the point of forming a homogeneous medium (e.g., a ceramic). Thus, in the filterable composite adsorbents of the present invention, adsorbent component(s) and functional filtration component(s) and are agglomerated and intimately bound, but retain those physical and chemical properties of these components which are deemed to be desirable in the resulting product, and therefore enhance the overall properties of the resulting product.

1. Adsorbent Components

Adsorbent components suitable for use in preparation of the filterable composite adsorbents of the present invention are microparticulate or colloidal adsorbent components which are characterized by the property of having adsorbency. Preferred adsorbent components have a specific surface area of about 300 to about 1200 m$^2$/g, having a high proportion of pores with a size of less than about 50 nm.

The term "colloidal" is used herein to refer to adsorbent particles having a particle size of less than about 1 $\mu$m (and typically greater than about 0.5 nm). The term "microparticulate" is used herein to refer to adsorbent particles having an particle size of about 1 $\mu$m to about 500 $\mu$m, but more commonly about 1 $\mu$m to about 30 $\mu$m.

In a preferred embodiment, the adsorbent component is selected from the group consisting of silica gel; fumed silica; neutral clay; alkaline clay; zeolite; solid catalyst; alumina, such as activated alumina; adsorbent polymer, for example, expanded polystyrene-divinylbenzene copolymer; and alkaline earth silicate hydrate, such as calcium silicate hydrate and magnesium silicate hydrate.

2. Functional Filtration Components

Functional filtration components suitable for use in preparation of the filterable composite adsorbents of the present invention are characterized by a distinguishing porous and intricate structure and buoyancy suitable for filtration. These materials usually possess relatively large pore sizes especially suitable for particle entrapment, thereby permitting mechanical filtration and/or clarification by means of removal of microparticulate or colloidal particulates.

In a preferred embodiment, the functional filtration component is selected from the group consisting of biogenic silica (for example, diatomite, rice hull ash, sponge spicules); buoyant glass, for example natural glass (such as expanded perlite, pumice, expanded pumice, pumicite, expanded obsidian, expanded volcanic ash, other natural glasses, sand), synthetic glass (such as fiber glass, controlled pore glass, foamed glass); buoyant polymer, for example, a fibrous polymer (such as fibrous nylon, fibrous polyester) or a powdered polymer (such as polyvinylchloride-acrylic copolymer powder); and cellulose.

The term "biogenic silica" is used herein in the conventional sense and refers to silica produced or brought about by living organisms. A common example of biogenic silica is diatomite, obtained from diatomaceous earth (also known as kieselguhr), which is a sediment enriched in biogenic silica in the form of the siliceous frustules (i.e., shells or skeletons) of diatoms. Diatoms are a diverse array of microscopic, single-celled golden brown algae of the class Bacillariophyceae, which possess an ornate siliceous skeleton (i.e., frustule) of varied and intricate structure consisting of two valves which, in the living diatom, fit together much like a pill box. The morphology of the frustules varies widely among species and serves as the basis for taxonomic classification; over at least 2,000 distinct species are known. The surface of each valve is punctuated by a series of openings that comprise the complex fine structure of the frustule and impart a design that is distinctive to individual species. The size of typical frustules ranges from 0.75 to 1,000 $\mu$m, although the majority are in the range of 10 to 150 $\mu$m. These frustules are sufficiently durable to retain much of their porous and intricate structure virtually intact through long periods of geologic time when preserved in conditions that maintain chemical equilibrium. Other sources of biogenic silica are known, as many plants, animals, and microorganisms provide concentrated sources of silica with unique characteristics. For example, rice hulls contain sufficient silica that they are commercially ashed for their siliceous residue, a product known familiarly as "rice hull ash." Certain sponges are also concentrated sources of silica, the remnants usually occurring in geologic deposits as acicular spicules.

The term "natural glass" is used herein in the conventional sense and refers to natural glasses, commonly referred to as volcanic glasses, which are formed by the rapid cooling of siliceous magma or lava. Several types of natural glasses are known, including, for example, perlite, pumice, pumicite, obsidian, and pitchstone. Prior to processing, perlite is generally gray to green in color with abundant spherical cracks which cause it to break into small pearl-like masses. Pumice is a very lightweight glassy vesicular rock.

Obsidian is generally dark in color with a vitreous luster and a characteristic conchoidal fracture. Pitchstone has a waxy resinous luster and is frequently brown, green, or gray. Volcanic glasses such as perlite and pumice occur in massive deposits and find wide commercial use. Volcanic ash, often referred to as tuff when in consolidated form, consists of small particles or fragments which are often in glassy form; as used herein, the term natural glass encompasses volcanic ash.

Most natural glasses are chemically equivalent to rhyolite. Natural glasses which are chemically equivalent to trachyte, dacite, andesite, latite, and basalt are known but are less common. The term obsidian is generally applied to massive natural glasses that are rich in silica. Obsidian glasses may be classified into subcategories according to their silica content, with rhyolitic obsidians (containing typically about 73% $SiO_2$ by weight) as the most common (Berry, 1983).

Perlite is a hydrated natural glass containing typically about 72–75% $SiO_2$, 12–14% $Al_2O_3$, 0.5–2% $Fe_2O_3$, 3–5% $Na_2O$, 4–5% $K_2O$, 0.4–1.5% CaO (by weight), and small of other metallic elements. Perlite is distinguished from other natural glasses by a higher content (2–5% by weight) of chemically bonded water, the presence of a vitreous, pearly luster, and characteristic concentric or arcuate onion skin-like (i.e., perlitic) fractures.

Perlite products are often prepared by milling and thermal expansion, and possess unique physical properties such as high porosity, low bulk density, and chemical inertness. Expanded perlite has been used in filtration applications since about the late 1940's (Breese and Barker, 1994). Conventional processing of perlite consists of comminution (crushing and grinding), air size classification, thermal expansion, and air size classification of the expanded material to meet the specifications of the finished product. For example, perlite ore is crushed, ground, and classified to a predetermined particle size range (e.g., passing 30 mesh), then classified material is heated in air at a temperature of 870–1100° C. in an expansion furnace, where the simultaneous softening of the glass and vaporization of contained water leads to rapid expansion of glass particles to form a frothy glass material with a bulk volume up to 20 times greater than that of the unexpanded ore. Often, the expanded perlite is then air classified and optionally milled to meet the size specification of a desired product. The presence of chemically bonded water in other natural glasses (for example, pumice, obsidian, and volcanic ash) often permits "thermal expansion" in a manner analogous to that commonly used for perlite. The resulting products are commonly referred to as expanded natural glasses (i.e., expanded pumice, expanded obsidian, and expanded volcanic ash, respectively).

Pumice is a natural glass characterized by a mesoporous structure (e.g., having pores or vesicles with a size up to about 1 mm). The highly porous nature of pumice gives it a very low apparent density, in many cases allowing it to float on the surface of water. Most commercial pumice contains from about 60 to about 70% $SiO_2$ by weight. Pumice is typically processed by milling and classification (as described above for perlite), and products are primarily used as lightweight aggregates and also as abrasives, absorbents, and fillers. Unexpanded pumice and thermally expanded pumice (prepared in a manner analogous to that used for perlite) may also be used as filter aids in some cases (Geitgey, 1979), as can volcanic ash.

3. Examples of Filterable Composite Adsorbents

The appropriate selection of adsorbent components and functional filtration components of a filterable composite adsorbents is determined by the specific application intended. For example, in a filtration process that demands exceptional clarity but tolerates slower flow rate, a filterable composite adsorbent product of low permeability is preferred, whereas in a filtration process that demands high flow rate but does not require exceptional clarity, a filterable composite adsorbent product of high permeability is preferred. Similar reasoning applies to the choice of adsorbent components, and to the composite adsorbent products when used in conjunction with other materials, or when preparing mixtures containing the products.

Silica gel adsorbents are commonly used in the chillproofing of beer. Beer contains certain high molecular weight proteins (e.g., anthocyanodins) that precipitate when finished beer is chilled, creating a haze in beer that is deemed undesirable by brewers. By adding a silica gel adsorbent to the beer before filtration, a large concentration of these proteins are adsorbed by the silica gel, but the silica gel-protein complexes must be thoroughly removed during a subsequent filtration, usually by means of a porous filtration media. The porous filtration media is also used to remove yeast and other turbid particulate matter from the brewing process. Removing the silica gel-protein complexes from the beer significantly adds to the filtration burden such that the efficiency of the porous filtration media is reduced.

In one embodiment of the present invention, a silica gel adsorbent of a variety useful in chillproofing of beer, is thermally sintered to expanded perlite, a natural glass that is commonly used as a porous filtration media. The resulting filterable composite adsorbent has both the properties of the chillproofing obtained from the silica gel adsorbent, as well as the filtration properties of the expanded perlite porous filtration media. The filterable composite adsorbent is capably of performing both the functions of protein adsorption to reduce chill haze, as well as filtration of the other undesirable constituents of the beer. To maximize the adsorption of proteins contributing to chill haze, a preferred mode of using this particular filterable composite adsorbent is through body feeding in addition to precoating.

Bleaching clay (i.e., a neutral or alkaline form of clay) is commonly used to remove color bodies from edible oils, which commonly contain undesirable chlorophylls when the oils are pressed from botanical sources. However, bleaching clay is a very fine powder, and must be separated from the oil after adsorption has taken place; this separation is a slow and tedious process.

In another embodiment of the present invention, an activated bleaching clay, of a variety useful in decolorizing edible vegetable oils, is thermally sintered to expanded perlite, a natural glass product that is commonly used as a porous filtration media. The resulting filterable composite adsorbent has both the bleaching properties of the activated clay adsorbent, as well as the filtration properties of the expanded perlite porous filtration media. The ease of adsorbent use and the utility and effectiveness of filtration are both greatly improved. Again, the preferred mode of using this particular filterable composite adsorbent is through body feeding in addition to precoating.

B. Methods for Characterizing the Filterable Composite Adsorbents of the Present Invention The filterable composite adsorbents of the present invention possess unique properties, as they are comprised of both an adsorbent component as well as a functional filtration component. These filterable composite adsorbents retain both the adsorbent properties of the adsorbent component and the intricate and porous structure that is characteristic of the functional filtration component as evidenced by the media having suitable permeability in ranges useful to filtration.

Important properties of the filterable composite adsorbents of the present invention, and suitable methods for their determination, are described in detail below.

1. Permeability

The filterable composite adsorbents of the present invention may be processed to provide a range of filtration rates, which are closely related to their permeability, P. Permeability is often reported in units of darcies, commonly abbreviated "Da"; 1 darcy corresponds to the permeability through a filter medium 1 cm thick which allows 1 cm$^2$ of fluid with a viscosity of 1 centipoise to pass through an area of 1 cm$^2$ in 1 sec under a pressure differential of 1 atm (i.e., 101325 kPa). Permeability is readily determined (European Brewery Convention 1987) using a specially constructed device designed to form a filter cake on a septum from a suspension of functional filtration media in water, and then measuring the time required for a specified volume of water to flow through a measured thickness of filter cake of known cross-sectional area. The principles have been previously derived for porous media from Darcy's law (Bear, 1988), and so an array of alternative devices and methods are in existence that correlate well with permeability. Most functional filtration media suitable for microfiltration, such as diatomite and perlite products that are commercially available span a wide range of permeability, from about 0.001 Da (more typically 0.05 Da) to over 30 Da, while those suitable for coarse filtration, such as sand, have much greater permeabilities of approximately 1000 Da or more.

The filterable composite adsorbents of the present invention offer a spectrum of permeabilities comparable to the range offered by their functional filtration components.

Evidence of the intimate binding of the adsorbent component(s) and the functional filtration component(s), and thus the formation of the filterable composite adsorbent may generally be provided by observing a larger permeability for the filterable composite adsorbent (e.g., after thermal sintering and/or chemical bonding, and unmilled, i.e., without further attrition or classification) than for the simple mixture of its components (i.e., prior to thermal sintering and/or chemical bonding).

For example, if a simple mixture of an adsorbent component and a functional filtration component (having permeabilities of 0.71 Da and 9.30 Da, respectively) has a permeability, P(a+b), of 2.96 Da, and the filterable composite adsorbent prepared from this simple mixture has a permeability, P(c), of 7.43 Da, then the increase in permeability is evidence of agglomeration. Preferably, P(c) is greater than P(a+b) by 5% or more, more preferably 10% or more, yet more preferably 20% or more.

The selection of filtration permeability for a specific filtration process depends on the flow rate and degree of fluid clarification required for the particular application. In many cases, the flow of fluid through a functional filtration component is closely related to the nature of the functional filtration component's porosity. Within a given family of functional filtration components of the same kind, those of low permeability have smaller pores capable of providing greater clarity because smaller particles can be retained during the filtration process, whereas those of high permeability have larger pores capable of providing greater fluid flow, but usually at the expense of the ability to remove particles as small as those removed by their low permeability counterparts.

2. Particle Size

An important characteristic of the filterable composite adsorbent of the present invention relates to agglomeration of the component particles, preferably through thermal sintering and/or chemical bonding. One method for quantifying the degree of agglomeration involves determining the difference in particle size distribution between the components (i.e., before agglomeration) and the resulting filterable composite adsorbent.

The preferred method for determining particle size distribution employs laser diffraction. The preferred instrument for determining the particle size distribution of the advanced composite filtration media, or its components, is a Leeds & Northrup Microtrac Model X-100. The instrument is fully automated, and the results are obtained using a volume distribution formatted in geometric progression of 100 channels, running for 30 seconds with the filter on. The distribution is characterized using an algorithm to interpret data from the diffraction pattern which assumes the particles have spherical shape characterized by a diameter, D. A median particle diameter is identified by the instrument as $D_{50}$, that is, 50% of the total particle volume is accounted for by particles having a diameter equal to or less than this value.

Evidence of agglomeration and thus the formation of the filterable composite adsorbent (i.e., wherein the adsorbent component and the functional filtration component are intimately bound) may be provided by calculating the weighted average of the median particle diameter of the simple mixture of the adsorbent component and the functional filtration component (i.e., prior to thermal sintering and/or chemical bonding) and the median particle diameter of the filterable composite adsorbent prepared using that mixture (e.g., after thermal sintering and/or chemical bonding, and unmilled, i.e., without further attrition or classification).

For example, agglomeration has occurred when the weighted average, $D_{50}(a+b)$, of the median particle diameter of the adsorbent component, $D_{50}(a)$, and the median particle diameter of the functional filtration component, $D_{50}(b)$, is less than the median particle diameter of the filterable composite adsorbent, $D_{50}(c)$. For example, if $D_{50}(a)$ is equal to 24.61 μm and comprises 67% by weight of the advanced composite filtration media, and if $D_{50}(b)$ is equal to 2.29 μm and comprises 33% by weight of the advanced composite filtration media, then, $$D_{50}(a+b) = [(0.667 \times 24.61) + (0.333 \times 2.29)]$$

$$= 17.17 \text{ μm}$$

If the actual measured median particle diameter of the filterable composite adsorbent, $D_{50}(c)$, is equal to 26.47 μm, then agglomeration has occurred, since $D_{50}(a+b)$ is less than $D_{50}(c)$. Preferably, $D_{50}(c)$ is greater than $D_{50}(a+b)$ by 1% or more, more preferably 2% or more, more preferably 5% or more, still more preferably 10% or more, yet more preferably 20% or more.

The application of the particle size method is most appropriate when particles of the adsorbent component, the functional filtration component, and the filterable composite adsorbent all have approximately equal densities and approximate the spherical shape of particles assumed by the algorithm. In cases where the adsorbent component is fibrous in nature, the more general permeability method is preferred.

C. Methods for Preparing the Filterable Composite Adsorbent of the Present Invention The filterable composite adsorbents of the present invention comprise one or more microparticulate or colloidal adsorbent components which are intimately bound to one or more functional filtration components. One convenient method of preparing filterable composite adsorbents of the present invention is by blending an adsorbent component with a functional filtration component, followed by treatment of the blend so that the adsorbent component(s) are intimately bound to the functional filtration component(s). An example of a suitable treatment which may be used is chemical bonding, and may include the practice of thermal sintering.

In one preferred method, filterable composite adsorbents of the present invention are prepared by blending an adsorbent component with a functional filtration component, followed by the application of heat to cause thermal sintering (i.e., chemical bonding) to occur. Another convenient method of preparing filterable composite adsorbents of the present invention is by blending an adsorbent component with a functional filtration component, followed by the application of heat and/or radiation, and optionally in the presence of a fluxing chemical (e.g., soda ash), to cause the formation of strong chemical bonds between the adsorbent component and the functional filtration component.

The adsorbent component and the functional filtration component may be mixed in any proportion, and the proportions employed are determined by the selected adsorbent component and functional filtration component and by the filterable composite adsorbent sought. For example, at the adsorbent component-poor end of the spectrum, the adsorbent component may typically comprise as little as 0.1 to 5% by weight (i.e., of the simple mixture comprising the adsorbent component and the functional filtration component, prior to treatment), whereas, at the adsorbent component-rich end of the spectrum, the functional filtration component may typically comprise as much as 70 to 99% by weight (i.e., of the simple mixture comprising the adsorbent component and the functional filtration component, prior to treatment).

Blending of the adsorbent component with a functional filtration component, prior to treatment (e.g., thermal sintering and/or chemical bonding), may be readily accomplished using, for example, a mechanical mixer, for a suitable length of time to allow the components to become thoroughly mixed. More intimate blends may be obtained when the components are introduced in a fluidized form, for example, as a liquid slurry.

For thermal sintering, heat may be applied using, for example, a conventional oven, microwave oven, infrared oven, muffle furnace, kiln, or a thermal reactor, in ambient atmospheres such as, for example, air, or artificial atmospheres such as, for example, nitrogen (i.e., $N_2$) or oxygen (i.e., $O_2$) at temperatures typically ranging from 100 to 2500° F. (i.e., 40 to 1400° C.) and at pressures ranging from 0.1 to 50 atm (i.e., 1 to 5000 kPa). Heat treatment parameters, such as temperature and duration, are determined by the selected adsorbent component and functional filtration component and by the filterable composite adsorbent sought. For example, durations may range from about 1 ms (e.g., in fluidized bed reactors) to about 10 hours (e.g., in conventional furnaces).

Specific properties of filterable composite adsorbents can be further modified by further physical or chemical reaction of the media after the initial filterable composite adsorbent has been made, especially to enhance one or more particular properties (for example, solubility or surface characteristics), or to yield a new product with a specialized use. Examples of such further modifications include, for example, hydration, acid washing, surface treatment, and/or organic derivatization.

1. Hydration

Another class of filterable composite adsorbent products may be prepared from the filterable composite adsorbents described above by washing, rinsing, immersing, or otherwise contacting with water (i.e., $H_2O$), followed by drying to achieve a suitable degree of hydration (e.g., 0.1 to 60% water by weight). For example, it may be desirable to hydrate a sintered silica gel filterable composite adsorbent to yield a filterable composite adsorbent product with enhanced adsorptive properties.

2. Acid Washing

Another class of filterable composite adsorbent products may be prepared from the filterable composite adsorbents described above by washing with an acidic substance, followed by rinsing with deionized water to remove deionized water to remove residual acid, and subsequent drying. Acid washing of filterable composite adsorbent products may be beneficial in reducing the concentration of soluble contaminants, e.g., iron or aluminum, or in activating the adsorbent. Suitable acids include mineral acids, for example, sulfuric acid (i.e., $H_2SO_4$), hydrochloric acid (i.e., HCl), phosphoric acid (i.e., $H_3PO_4$), or nitric acid (i.e., $HNO_3$), as well as organic acids, for example, citric acid (i.e., $C_6H_8O_7$) or acetic acid (i.e., $CH_3COOH$).

3. Surface Treatment

Another class of filterable composite adsorbent products may be prepared by treatment of the filterable composite adsorbents described above, for example, by silanization, thereby modifying the product's surface such that it is rendered either more hydrophobic or more hydrophilic. Silanization is of particular utility if either the adsorbent components or functional filtration components are siliceous, or are polymeric in nature.

For example, the filterable composite adsorbent may be placed in a plastic vessel, and a small quantity of dimethyldichlorosilane (i.e., $SiCl_2(CH_3)_2$) or hexamethyldisilazane (i.e., $(CH_3)_3Si—NH—Si(CH_3)_3$) is added to the vessel. Reaction is allowed to take place at the surface in the vapor phase over a 24 hour period, resulting in more hydrophobic products. Such products have particular utility in applications involving hydrocarbons and oils.

Similarly, the filterable composite adsorbent can be reacted, for example, by suspending it in a solution containing 10% (w/v) aminopropyltriethoxysilane (i.e., $C_9H_{23}NO_3Si$) in water, refluxing at 700° C. for 3 hours, filtering the mixture, and drying the remaining solids to obtain more hydrophilic products. Such products have particular utility in applications involving aqueous systems, and permit further derivatization of the product, having converted terminal hydroxyl (i.e., —OH) functional groups of the advanced composite filtration media product surface to aminopropyl groups (i.e., —$(CH_2)_3NH_2$).

4. Organic Derivatization

Hydrophilic modified filterable composite adsorbent products can be further reacted to bind organic compounds, for example, a protein. The filterable composite adsorbent may thereby serve as a support for the immobilization of organic compounds. So modified, the product has utility in applications such as biochemical purification. A number of other reactions pertaining to derivatization of siliceous and polymeric products have been previously described (Hermanson, 1992). However, derivatization of the filterable composite adsorbents of the present invention yields modified filterable composite adsorbent products (which are within the scope of the present invention) with substantially superior efficacy as a result of the intimate binding of one or more adsorbent components with one or more functional filtration components.

D. Methods of Using the Filterable Composite Adsorbent of the Present Invention The filterable composite adsorbents of the present invention are useful in many of the same applications as currently available adsorbents, but offer the added properties of functional filtration media, such as, for example, increased permeability, low centrifuged wet density, uniquely shaped particles (e.g., fibers) as well as improved efficiency and/or economy, which are particularly valuable characteristics for adsorbent applications.

The filterable composite adsorbent of the present invention, and their further modifications, may be used in filtration applications in a manner analogous to that of porous filtration media. Filterable composite adsorbents may be applied to a septum to improve clarity and increase flow rate in filtration processes in a step sometimes referred to as "precoating," or added directly to a fluid as it is being filtered to reduce the loading of undesirable particulate at the septum while maintaining a designed liquid flow rate, in a step often referred to as "body feeding." Depending on the particular separation involved, filterable composite adsorbents may be used in precoating, body feeding, or both. The working principles involved with porous media filtration have been developed over many years, and have recently been reviewed in detail from both practical perspectives (Cain, 1984; Kiefer, 1991) as well as from their underlying theoretical principles (Bear, 1988; Norden, 1994).

The filterable composite adsorbents of the present invention can be shaped, molded, extruded, or sintered into permeable sheets, plates, disks, polyhedrons, or other formed shapes that have adsorbent properties. Fluids can then be passed through these modifications of the filterable composite adsorbents to achieve both filtration and adsorption.

The filterable composite adsorbents of the present invention may be used in conjunction with other media (e.g., different porous filtration media products) to form a filter aid composition for use in filtration applications and/or to further modify or optimize a filtration process. For example, mixtures of the filterable composite adsorbent with, for example, diatomite, expanded perlite, pumicite, natural glass, cellulose, activated charcoal, clay, or other materials, are useful filter aid compositions. Sometimes, these blends are more elaborate, and enable the blend to be formed into sheets, pads, cartridges, or monolithic or aggregate media capable of being used as supports or substrates.

The appropriate selection of which composition or modification of a filterable composite adsorbents is preferred is determined by the specific application. For example, in a filtration process that demands exceptional clarity but tolerates slower flow rate, a filterable composite adsorbent product of low permeability is preferred, whereas in a filtration process that demands high flow rate but does not require exceptional clarity, a filterable composite adsorbent product of high permeability is preferred. Similar reasoning applies to the choice of adsorbent components, and to the composite adsorbent products when used in conjunction with other materials, or when preparing mixtures containing the products. The quantity of product which is used is similarly determined by the specific process to which it is applied.

The silanized hydrophobic or hydrophilic filterable composite adsorbent products are desirable when these properties further improve the filtration performance, owing to their greater compatibility with other materials or ingredients in a specific application.

The composite products of the present invention can also be useful in applications other than filtration, since adsorbents or filtration media can be useful in applications that do not necessarily depend explicitly on either conventional adsorption or filtration. For example, substances such as silica gel, fumed silica, neutral clay, alkaline clay, zeolites, catalysts, polymers, and alkaline earth silicate hydrates can be used as fillers, and biogenic silica, natural glass, expanded perlite, pumice, expanded pumice, pumicite, expanded obsidian, expanded volcanic ash, buoyant glass, buoyant polymer, and cellulose can also be used as fillers. Thus, the filterable composite adsorbent products of the present invention may be useful as composite products used in numerous filler applications. For example, they may be used to alter the appearance or properties of paints, enamels, lacquers, and related coatings and finishes. The products may also be useful in paper formulations and paper processing applications, to provide antiblock or reinforcing properties to polymers, as abrasives, buffing, or polishing compounds, or other filler applications. In particular, the use of composites of the present invention offer increased flexibility for the use of these materials in filler applications. The composites of the present invention are also useful in the processing and preparation of a variety of catalysts, as chromatographic supports, and as other support media. In such other applications, the filterable composite adsorbent may be blended with other ingredients to make monolithic or aggregate media useful as supports (e.g., for microbe immobilization), substrates (e.g., for enzyme immobilization), or in the preparation of catalysts.

Many other modifications and variations of the invention as hereinbefore set forth can be made without departing from the spirit and scope thereof and therefore only such limitations should be imposed as are indicated by the appended claims.

E. EXAMPLES

Several filterable composite adsorbents of the present invention, and methods for preparing them, are described in the following examples, which are offered by way of illustration and not by way of limitation.

Example 1

Silica Gel/Expanded Perlite Filterable Composite Adsorbent

A mixture containing 60.6% (w/w) expanded perlite as a functional filtration component (Harborlite® 2000S, Harborlite Corporation, Lompoc, Calif.), 36.4% (w/w) silica gel as an adsorbent component (Britesorb® 100, PQ Corporation, Valley Forge, Pa.; first dried at 110° C. for 2 hours, with the microparticulates then dispersed with gentle grinding), and 3% (w/w) milled soda ash ($Na_2CO_3$) as a chemical sintering aid, were placed in a sealed plastic bag and shaken for approximately 5 minutes to thoroughly blend the ingredients. The mixture was then placed in a muffle furnace at 800° C. in air for 20 minutes, then the furnace door was opened and the material raked to disperse the particles for even sintering, and allowed to continue to heat in the muffle furnace at 800° C. in air for an additional 20 minutes. The product was then removed and allowed to cool to room temperature. Upon cooling, the material was brushed through a 30 mesh (i.e., with nominal openings of 600 μm) screen to disperse the particles, thus resulting in the filterable composite adsorbent product.

Permeabilities of the expanded perlite and silica gel were determined to be 9.30 and 0.71 Da, respectively, and a simple mixture of the two (i.e., without intimate binding) was determined to have a permeability of 2.96. The filterable composite adsorbent, however, had a permeability of 7.43, substantially greater than that of the simple mixture, and thereby greatly increasing the filterability and utility of the silica gel adsorbent.

In addition to studying the improved filterability, verification of adsorbent activity of this example of the present invention was performed using a saturated ammonium sulfate precipitation limit test, as described below.

One particularly useful method of determining the effectiveness of chillproofing adsorbents for beer is to titrate beer with a solution of saturated ammonium sulfate (i.e., $(NH_4)_2SO_4$), thereby precipitating proteins of high molecular weight involved in haze formation, and measuring the turbidity produced.

In practice, a solution of saturated ammonium sulfate is prepared by dissolving 100 g of ammonium sulfate in about 100 mL of deionized water in a flask at room temperature, shaking it well, and allowing the solution to stand for 16 hours. The saturated solution will normally have undissolved ammonium sulfate crystals at the bottom of the flask after standing, and the working saturated solution is decanted from the top. A 2.5 g sample of the material to be tested is placed in a 250 mL Erlenmeyer flask, 100 mL of decarbonated beer added, and the mixture shaken on a platform shaker for 30 minutes. The mixture is then filtered by vacuum through Whatman No. 5 filter paper on a Buchner funnel, and a 50 mL aliquot is transferred into a wide-mouth titration flask. The turbidity is first measured prior to titration using a turbidimeter (Hach Model 2100 AN). From a 50 mL Class A buret, saturated ammonium sulfate solution is added to the flask in 1.00 mL increments, the solution swirled to mix well before each measurement, and the turbidity measured. After each measurement, the solution is poured back into the titration flask, and another 1.00 mL increment is added. The point in the titration in which turbidity becomes substantially pronounced represents the endpoint. At least five additional endpoints should be measured in order to increase the accuracy of determining the endpoint.

For convenience, the results can be expressed in units of SASPL ("saturated ammonium sulfate precipitation limit"), which are equal to the milliliters of saturated ammonium sulfate solution required to reach the endpoint. For an untreated beer having a known SASPL, the greater the SASPL is after treatment with an adsorbent, the more effective the adsorbent is.

For this example of the present invention, untreated beer was determined to have 6 SASPL units, and treatment with expanded perlite alone increased the SASPL only to 6.5 units, while treatment with silica gel alone increased the SASPL to 12.5 units. Treatment of the beer with the filterable composite adsorbent of this example increased the SASPL to 9.5 units. The combining of these features of chillproofing ability with substantially greater permeability, as shown above, shows that the filterable composite adsorbent clearly offers greater utility and economy to this application.

Example 2

Clay/Expanded Perlite Filterable Composite Adsorbent

A 10 g sample of activated clay was selected as the adsorbent component (Filtrol® 105, Engelhard Corporation, Jackson, Miss.), was dispersed in sufficient deionized water to result in a 5% (w/v) slurry, and mixed for 1.5 hours using magnetic stirring to aid in dispersal of the clay microparticles. To the slurry were added 10 g of expanded perlite as the functional filtration component (Harborlite® 635, Harborlite Corporation, Lompoc, Calif.), 0.5 g of pulverized soda ash ($Na_2CO_3$) as a chemical sintering aid, and the mixture was further stirred for 15 minutes. The contents were then placed in a conventional microwave oven and dried at high power, which took approximately 20 minutes. The resulting cake was brushed through a 30 mesh screen (i.e., with nominal openings of 600 μm) to disperse the particles of the filterable composite adsorbent.

Permeabilities of the expanded perlite and activated clay were determined to be 1.36 Da and 0.01 Da, respectively, and a simple mixture (i.e., without intimate binding) was determined to have a permeability of 0.25 Da. The filterable composite adsorbent, however, had a permeability of 0.37 Da, greater than that of the simple mixture, and thereby increasing the filterability and utility of the activated clay adsorbent.

Example 3

Calcium Silicate Hydrate/Buoyant Polymer Filterable Composite Adsorbent

A 20 g sample of calcium silicate hydrate product (Micro-Cel® E, Celite Corporation, Lompoc, Calif.) was selected as an adsorbent component, and spread thinly over a flat plastic surface. Using a 140 mesh (i.e., with nominal openings of 106 μm) screen, 10 g of polyvinylchloride-acrylic copolymer (Geon® Resin 138, Geon, Avon Lake, Ohio) were brushed lightly over the surface of the calcium silicate hydrate layer. The resulting mixture was collected and further mixed in a sealed plastic bag by shaking for 5 minutes, and the mixture was then heated in an oven at 120° C. in air for 1 hour. The resulting material was removed from the oven, cooled, and screened through a 30 mesh (i.e., with nominal openings of 600 μm) screen to disperse the particles, thus resulting in the filterable composite adsorbent.

In this example, the functional filtration component was formed concurrently with the filterable composite adsorbent product. The median particle diameter of the calcium silicate hydrate adsorbent component and copolymeric functional filtration component were 24.61 μm and 2.29 μm, respectively, and weighted median particle diameter of a simple mixture, representing the proportions described, calculates to 17.17 μm. The filterable composite adsorbent product, however, had a median particle diameter of 26.47, thereby increasing the filterability and utility of the calcium silicate hydrate adsorbent.

Example 4

Silica Gel/Biogenic Silica Filterable Composite Adsorbent

A mixture containing 48.5% (w/w) diatomite (Celite™ 500, Celite Corporation, Lompoc, Calif.) as a functional filtration component, 48.5% (w/w) silica gel as an adsorbent component (Sil-Proof BG-6, Millenium Corporation, Baltimore, Md.) and 2.9% (w/w) milled soda ash ($Na_2CO_3$) as a chemical sintering aid, were placed in a plastic container and shaken for 30 minutes using a paint mixer (Red Devil Model No. 5410-0H) to thoroughly blend the ingredients. The mixture was then heated using a rotary tube furnace (Model No. HOU-3D18-RT-28, Harper Electric Furnace Corporation, Lancaster, N.Y.) set at an inclination angle of 4°, 882° C. and a rotation speed of 3.5 revolutions per minute. Upon exiting the rotary tube furnace, the material was allowed to cool to room temperature and then dispersed by passage through a 30 mesh (i.e., nominal openings of 60 μm screen) in order to obtain the filterable composite adsorbent material.

Permeabilities of the diatomite and silica gel were determined to be 0.048 and 0.011 Da respectively, and a simple mixture of the two (i.e., without intimate binding) was determined to have a permeability of 0.064 Da. The filterable composite adsorbent, however, has a permeability of 0.349 Da, substantially greater than that of the simple mixture, and thereby greatly increasing the filterability and utility of the silica gel adsorbent.

In addition to studying the improved filterability, verification of adsorbent activity of this example of the present invention was performed using a saturated ammonium sulfate precipitation test, as described below.

One useful method of determining the effectiveness of chillproofing adsorbents for beer is to add a solution of saturated ammonium sulfate (i.e., $(NH_4)_2SO_4$), thereby precipitating involved in haze formation, and measuring the turbidity produced.

In practice, a solution of saturated ammonium sulfate is prepared by dissolving 100 g of ammonium sulfate in about 100 mL of deionized water in a flask at room temperature, shaking it well, and allowing the solution to stand for 16 hours. The saturated solution will normally have undissolved ammonium sulfate crystals at the bottom of the flask after standing, and the working saturated solution is decanted from the top. A 0.1 g sample of the material to be tested is placed in a 250 ml Erlenmeyer flask, 200 mL of decarbonated beer added, and the mixture shaken on a platform shaker for 30 minutes. The mixture is then filtered by vacuum through Whatman No. 5 filter paper on a Buchner funnel, and a 50 mL aliquot is transferred into a 125 mL Erlenmeyer flask. The turbidity is first measured prior to addition of saturated ammonium solution using a turbidimeter (Hach model 2100 AN). From a 50 mL graduated cylinder, 30 mL of saturated ammonium sulfate solution is added to the flask, the mixture is swirled in order to mix well, and the mixture is then allowed to stand for 10 minutes. After 10 minutes, the turbidity of the mixture is measured. For an untreated beer having a known turbidity after saturated ammonium sulfate solution, the lower the turbidity is after treatment with an adsorbent, the more effective the adsorbent is.

For this example of the present invention, untreated beer (original, degassed turbidity=86.0 NTU) was determined to have a turbidity of 474 NTU after saturated ammonium sulfate solution addition, while treatment with silica gel alone resulted in a beer with a turbidity of 203 NTU. Treatment of the beer with the filterable composite adsorbent of this example resulted in a turbidity of 299 NTU. The combining of these features of chillproofing ability with substantially greater permeability, as shown above, shows that the filterable composite adsorbent clearly offers greater utility and economy to this application.

Example 5

Fumed Silica/Biogenic Silica Filterable Composite Adsorbent

A portion of fumed silica, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 6

Fumed Silica/Expanded Perlite Filterable Composite Adsorbent

A portion of fumed silica, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 7

Neutral Clay or Alkaline Clay/Biogenic Silica Filterable Composite Adsorbent

A portion of neutral clay or alkaline clay, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 8

Neutral Clay or Alkaline Clay/Expanded Perlite Filterable Composite Adsorbent

A portion of neutral clay or alkaline clay, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 9

Zeolite/Biogenic Silica Filterable Composite Adsorbent

A portion of zeolite, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 10

Zeolite/Expanded Perlite Filterable Composite Adsorbent

A portion of zeolite, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 11

Alumina/Biogenic Silica Filterable Composite Adsorbent

A portion of alumina, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 12

Alumina/Expanded Perlite Filterable Composite Adsorbent

A portion of alumina, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 13

Adsorbent Polymer/Biogenic Silica Filterable Composite Adsorbent

A portion of adsorbent polymer, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 14

Adsorbent Polymer/Expanded Perlite Filterable Composite Adsorbent

A portion of adsorbent polymer, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 15

Alkaline Earth Silicate Hydrate/Biogenic Silica Filterable Composite Adsorbent A portion of alkaline earth silicate hydrate, as an adsorbent component, a portion of biogenic silica as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

Example 16

Alkaline Earth Silicate Hydrate/Expanded Perlite Filterable Composite Adsorbent A portion of alkaline earth silicate hydrate, as an adsorbent component, a portion of expanded perlite as a functional filtration component, and optionally a portion of a chemical sintering aid, are mixed and thoroughly blended. The mixture is then heated and thermally sintered. The resulting agglomerate product is then cooled, and optionally screened according to particle size, to yield the desired filterable composite adsorbent.

F. References

The disclosures of the publications, patents, and published patent specifications referenced below are hereby incorporated by reference into the present disclosure to more fully describe the state of the art to which this invention pertains.

Analytica-EBC of the European Brewery Convention, 4th ed. (1987; Zurich: Braurei-und Getranke-Rundschan); pp. E-255 to E-258

Bear, J. (1988), *Dynamics of Fluids in Porous Media* (N.Y.: Dover Publications, Inc.) pp. 161–176.

Berry, L. G. et al. (1983), *Mineralogy*, 2nd ed. (N.Y.: Freeman and Co.), pp. 540–542.

Breese, R. and Barker, J. (1994), in *Industrial Minerals and Rocks* (Littleton, Colo.: Society for Mining, Metallurgy, and Exploration); pp. 735–749.

Brunauer, S., Emmett, P. H., and Teller, E. J. (1938), *Am. Chem. Soc.* 60, p.309.

Cain, C. W. Jr. (1984), in *Encyclopedia of Chemical Processing and Design* (N.Y.: Marcel Dekker), pp. 348–372.

Fukua, K. (1988), Japan Patent No. JP 88-294917 A2 (JP 63-294917).

Geitgey, R. P., (1979) in *Industrial Minerals and Rocks* (Littleton, Colo.: Society for Mining, Metallurgy, and Exploration, Inc.), pp. 803–813.

Guiambo, N., et al. (1991), *Mines & Carrieres: Les Techniques, Mar.*, pp. 29–32.

Hermanson, G. T. et al. (1992), *Immobilized Affinity Ligand Techniques* (San Diego, Academic Press Inc.)

Kiefer, J. (1991), *Brauwelt International*, IV/1991; pp. 300–309.

Kucera, F., et al. (1987), Czechoslovakia Patent No. CS 241725 B1.

Langmuir, I. (1916), *J. Am. Chem. Soc.* 38, p.2267

Langmuir, I. (1916), *Phys. Rev.* 8, p.149.

Langmuir, I. (1918), *J. Am. Chem. Soc.* 40, p. 1361

Machel, J., et al. (1973), *Przem. Chem.*, Vol. 52, No. 4, pp. 297–301.

McCollum, L. S., U.S. Pat. No. 2,967,149 issued Jan. 03, 1961.

Norden, H., et al. (1994), *Separation Science and Technology*, Vol. 29, No. 10, pp. 1319–1334.

Patel, R., et al. (1992), *Gov. Rep. Announce. Index (U.S.)*, 95:(5), No. 211, 222.

Ruthven, D. M., "Adsorption," in Kroschwitz, J. L., editor, *Kirk-Othmer Encyclopedia of Chemical Technology*, 4th ed., Vol. 1 (1991, John Wiley & Sons), pp. 493–528.

Schuler, P. F., et al. (1990), *J. Am. Water Works Assoc.*, Vol. 82, No. 12, pp. 67–75.

What is claimed is:

1. A filterable composite adsorbent in the form of a powder, said composite comprising agglomerated particles, and said particles comprising:
   one or more first adsorbent components selected from the group consisting of silica gel, fumed silica, neutral clay, alkaline clay, zeolite, solid catalyst, alumina, adsorbent polymer, and alkaline earth silicate hydrate;
   intimately bound by thermal sintering to one or more second functional filtration components selected from the group consisting of biogenic silica, natural glass, buoyant glass, buoyant polymer, and cellulose.

2. The composite according to claim 1, wherein said functional filtration component is a natural glass.

3. The composite according to claim 1, wherein said functional filtration component is biogenic silica.

4. The filterable composite adsorbent of claim 1 comprising silica gel intimately bound to biogenic silica.

5. The filterable composite adsorbent of claim 1 comprising silica gel intimately bound to a natural glass.

6. The filterable composite adsorbent of claim 5 wherein the natural glass is selected from the group consisting of expanded perlite, pumice, expanded pumice, pumicite, expanded obsidian, and expanded volcanic ash.

7. The filterable composite adsorbent of claim 6 comprising silica gel intimately bound to expanded perlite.

8. The filterable composite adsorbent of claim 7, wherein the adsorbent component and the functional filtration component are bound by strong chemical bonds.

9. The filterable composite adsorbent of claim 8, wherein the strong chemical bonds are formed in the presence of a fluxing material.

10. The filterable composite absorbent of claim 9 wherein the fluxing material is soda ash.

11. The filterable composite adsorbent of claim 7, wherein the silica gel is intimately bound to the expanded perlite by thermal sintering at a temperature of at least 800° C.

12. The filterable composite adsorbent of claim 1 comprising fumed silica intimately bound to biogenic silica.

13. The filterable composite adsorbent of claim 1 comprising fumed silica intimately bound to a natural glass.

14. The filterable composite adsorbent of claim 13 wherein the natural glass is selected from the group consisting of expanded perlite, pumice, expanded pumice, pumicite, expanded obsidian, and expanded volcanic ash.

15. The filterable composite adsorbent of claim 14 comprising fumed silica intimately bound to expanded perlite.

16. The filterable composite adsorbent of claim 1 comprising neutral clay or alkaline clay intimately bound to biogenic silica.

17. The filterable composite adsorbent of claim 1 comprising neutral clay or alkaline clay intimately bound to a natural glass.

18. The filterable composite adsorbent of claim 17 wherein the natural glass is selected from the group consisting of expanded perlite, pumice, expanded pumice, pumicite, expanded obsidian, and expanded volcanic ash.

19. The filterable composite adsorbent of claim 18 comprising neutral clay or alkaline clay intimately bound to expanded perlite.

20. The filterable composite adsorbent of claim 1 comprising zeolite intimately bound to biogenic silica.

21. The filterable composite adsorbent of claim 1 comprising zeolite intimately bound to a natural glass.

22. The filterable composite adsorbent of claim 21 wherein the natural glass is selected from the group consisting of expanded perlite, pumice, expanded pumice, pumicite, expanded obsidian, and expanded volcanic ash.

23. The filterable composite adsorbent of claim 22 comprising zeolite intimately bound to expanded perlite.

24. The filterable composite adsorbent of claim 1 comprising alumina intimately bound to biogenic silica.

25. The filterable composite adsorbent of claim 1 comprising alumina intimately bound to a natural glass.

26. The filterable composite adsorbent of claim 25 wherein the natural glass is selected from the group consisting of expanded perlite, pumice, expanded pumice, pumicite, expanded obsidian, and expanded volcanic ash.

27. The filterable composite adsorbent of claim 26 comprising alumina intimately bound to expanded perlite.

28. The filterable composite adsorbent of claim 1 comprising adsorbent polymer intimately bound to a biogenic silica.

29. The filterable composite adsorbent of claim 1 comprising adsorbent polymer intimately bound to a natural glass.

30. The filterable composite adsorbent of claim 29 wherein the natural glass is selected from the group consisting of expanded perlite, pumice, expanded pumice, pumicite, expanded obsidian, and expanded volcanic ash.

31. The filterable composite adsorbent of claim 30 comprising adsorbent polymer intimately bound to expanded perlite.

32. The filterable composite adsorbent of claim 1 comprising alkaline earth silicate hydrate intimately bound to biogenic silica.

33. The filterable composite adsorbent of claim 1 comprising alkaline earth silicate hydrate intimately bound to a natural glass.

34. The filterable composite adsorbent of claim 33 wherein the natural glass is selected from the group consisting of expanded perlite, pumice, expanded pumice, pumicite, expanded obsidian, and expanded volcanic ash.

35. The filterable composite adsorbent of claim 34 comprising alkaline earth silicate hydrate intimately bound to expanded perlite.

36. The composite according to claim 1, wherein
   the permeability of said composite is greater than the permeability of a simple mixture of said one or more first components and said one or more second components,
   wherein the proportions of said one or more first components and said one or more second components in said simple mixture are identical to those used in the preparation of said composite.

37. The composite according to claim 1, wherein
   the permeability of said composite is at least 5% greater than the permeability of a simple mixture of said one or more first components and said one or more second components,
   wherein the proportions of said one or more first components and said one or more second components in said simple mixture are identical to those used in the preparation of said composite.

38. The composite according to claim 1, wherein
   the median particle diameter of said composite is greater than the median particle diameter of a simple mixture of said one or more first components and said one or more second components,
   wherein the proportions of said one or more first components and said one or more second components in said simple mixture are identical to those used in the preparation of said composite.

39. The composite according to claim 1, wherein
the median particle diameter of said composite is at least 5% greater than the median particle diameter of a simple mixture of said one or more first components and said one or more second components,
wherein the proportions of said one or more first components and said one or more second components in said simple mixture are identical to those used in the preparation of said composite.

40. The composite according to claim 1, wherein each of said one or more second components has a permeability of 0.001 to 1000 Da.

41. The composite according to claim 1, wherein said composite is prepared using a stationary bed furnace or a rotary kiln furnace.

42. The filterable composite adsorbent of claim 1, wherein the adsorbent component and the functional filtration component are bound by strong chemical bonds.

43. The filterable composite adsorbent of claim 42, wherein the strong chemical bonds are formed in the presence of a fluxing material.

44. The filterable composite adsorbent of claim 43, wherein the fluxing material is soda ash.

45. The composite of claim 1, wherein the composite is a filterable composite adsorbent, and wherein the composite comprises agglomerated particles, said particles comprising;
one or more adsorbent components selected from the group consisting of silica gel, fumed silica, neutral clay, alkaline clay, zeolite, solid catalyst, alumina, adsorbent polymer, and alkaline earth silicate hydrate;
intimately bound by thermal sintering to one or more functional filtration components selected from the group consisting of a biogenic silica selected from the group consisting of diatomite, rice hull ash, and sponge spicules; a natural glass selected from the group consisting of expanded perlite, pumice, expanded pumice, pumicite, expanded obsidian, and expanded volcanic ash; buoyant glass; buoyant polymer; and cellulose.

46. The filterable composite adsorbent according to claim 45, wherein said adsorbent component is selected from the group consisting of silica gel and fumed silica.

47. The filterable composite adsorbent according to claim 45, wherein said adsorbent component is selected from the group consisting of neutral clays and alkaline clays.

48. The filterable composite adsorbent according to claim 45, wherein said adsorbent component is selected from the group consisting of zeolite, alumina, and alkaline earth silicate hydrate.

49. The filterable composite adsorbent according to claim 45, wherein said functional filtration component is diatomite.

50. The filterable composite adsorbent according to claim 45, wherein said functional filtration component is rice hull ash.

51. The filterable composite adsorbent according to claim 45, wherein said functional filtration component is sponge spicules.

52. The filterable composite adsorbent according to claim 45, wherein said functional filtration component is a selected from the group consisting of expanded perlite, pumice, expanded pumice, pumicite, expanded obsidian, and expanded volcanic ash.

53. The filterable composite adsorbent according to claim 45, wherein said functional filtration component is expanded perlite.

54. A method of adsorption and filtration comprising the step of (i) suspending a filterable composite adsorbent according to claim 45 in a fluid containing suspended particulates or constituents to be adsorbed, followed by the step of (ii) separating said filterable composite adsorbent from said fluid.

55. A method of adsorption and filtration according to claim 54, wherein said fluid is a liquid, a molten solid, or a gas.

56. A method of adsorption and filtration comprising the step of (i) suspending a filterable composite adsorbent according to claim 45 in a fluid containing suspended particulates or constituents to be adsorbed, followed by the step of (ii) passing said fluid with suspended particulates or constituents through the filterable composite adsorbent supported on a septum.

57. A method of adsorption and filtration according to claim 56, wherein said fluid is a liquid, a molten solid, or a gas.

58. A method of adsorption and filtration comprising the step of passing a fluid containing suspended particles or constituents to be adsorbed through a filterable composite adsorbent according to claim 45 which is supported on a septum.

59. A method of adsorption and filtration according to claim 58, wherein said fluid is a liquid, a molten solid, or a gas.

60. A method for the preparation of a filterable composite adsorbent according to claim 45, said method comprising the steps of (i) blending one or more adsorbent components with one or more functional filtration components, and (ii) applying microwave radiation applied to the blend, thereby forming said filterable composite adsorbent.

* * * * *